Patented Nov. 24, 1942

2,302,729

UNITED STATES PATENT OFFICE 2,302,729

PROCESS OF PURIFYING 1-NITRO-ANTHRAQUINONE

Myron S. Whelen, Wilmington, Del., assignor to E. I. du Pont de Nemours & Company, Wilmington, Del., a corporation of Delaware No Drawing. Application April 5, 1941, Serial No. 387,071

2 Claims. (Cl. 260—369)

This invention relates to the preparation of 1-nitroanthraquinone and more particularly to a new and improved process for purifying 1-nitroanthraquinone to free it from isomeric nitro derivatives and other impurities normally occurring therewith.

In the direct nitration of anthraquinone in concentrated sulfuric acid it was found that irrespective of how carefully the nitration is carried out a certain amount of isomeric dinitroanthraquinones or other impurities are produced from which it is very difficult to separate out pure 1-alpha-nitroanthraquinone. This product has therefore usually been produced, for commercial use as a dye intermediate, by the amidation of 1-anthraquinone sulfonic acid.

While it has been known that 1-nitro-2-methylanthraquinone can be purified by treating it with sodium sulfite as more particularly described in U. S. P. 1,540,467, it was also known that similar treatment of alpha-nitroanthraquinone not only did not effect a purification of that compound but converted it to water soluble bodies which were generally considered to be anthraquinone sulfonic acids. (See for instance Locher & Fierz, Helvetica Chemica Acta, 10, page 645.)

It is therefore an object of this invention to provide a simple and economical method for obtaining 1-nitroanthraquinone in a very pure form and in high yields, directly from anthraquinone or the ortho-benzoyl-benzoic acid from which the anthraquinone is produced.

I have found that 1-nitroanthraquinone can be produced in a very pure form and in relatively high yields by direct nitration of anthraquinone in sulfuric acid and by treating the resulting crude 1-nitroanthraquinone with a dilute solution of sodium sulfite, preferably of from about 1 to 2% concentration, the amount of sodium sulfite employed being equivalent to from 0.2 to 0.5 mole per mole of anthraquinone originally employed. The actual concentration of the sodium sulfite solution employed may be varied within quite wide limits so long as the actual amount of the sulfite present in the solution relative to the nitroanthraquinone being treated is carefully controlled. The amount of sodium sulfite employed should of course be the minimum actually necessary to produce the desired purity, for when an excess over that actually required is used the yield of the purified nitroanthraquinone is greatly reduced by converting it to the water soluble compounds as more particularly described by Locher & Fierz. The minimum amount of sodium sulfite will depend upon the care with which the nitration of the anthraquinone was carried out and upon the particular process employed. Where the anthraquinone is produced from ortho-benzoyl-benzoic acid it may be nitrated directly in the ring closure reaction mass.

The following example is given to illustrate the invention. The parts used are by weight.

Example

One hundred and twelve (112) parts of ortho-benzoyl-benzoic acid and six hundred (600) parts of monohydrate are heated together at 135° for four hours. After cooling there is added eighty-two (82) parts of water and the temperature is adjusted to 30–35° C. and at this temperature over a period of about one hour is added one hundred and ten and a half (110.5) parts of mixed nitric and sulfuric acids containing 32.1% nitric acid and 66.65% sulfuric acid, and the nitration mass is then heated for three hours at 65–70° C. It is then cooled, drowned in water, and the precipitated 1-nitroanthraquinone is separated by filtration and washed free of acid with water. The cake is then suspended in 2000 to 3000 parts of water containing from 15 to 30 parts of sodium sulfite (anhydrous) and the whole is digested for 10 hours at reflux, 101° C. It is made alkaline with sodium hydroxide, filtered hot and washed free of alkali with hot water and dried. The 1-nitroanthraquinone so obtained has a melting point of about 211° C., compared to 198° C. for the material not purified by sulfite treatment. If instead of isolating the 1-nitroanthraquinone it is desired to convert it to 1-aminoanthraquinone, the reduction may be carried out with the usual alkaline reducing agents immediately after the sodium sulfite treatment, by simply adding the reducing agent to the digestion mass followed by heating, or by first filtering after the digestion and subjecting the filtered off material to reduction in the usual manner, 1-aminoanthraquinone is obtained in a yield of from 76 to 83% based on the ortho-benzoyl-benzoic acid originally employed, the specific yield depending on the amount of sodium sulfite employed. The 1-aminoanthraquinone has a nitrogen content of 6.09% to 6.33%, and a melting point of 254° C., compared to a product containing 6.75% nitrogen, and a melting point of 248.5° C. which is obtained if the sodium sulfite treatment is omitted. (The theoretical nitrogen content of 1-aminoanthraquinone is 6.27%, and the melting point of highly pure alpha - aminoanthraquinone is 254° C.)

Where the amount of sodium sulfite employed is sufficient to convert the isomeric nitroanthraquinones or other impurities to water soluble form, the use of additional sodium sulfite does not increase the purity of the resulting 1-nitroanthraquinone, and to obtain maximum yields the quantity of sodium sulfite obtained should be maintained at a minimum. In commercial operations preliminary control experiments may be run to determine the actual quantity to be employed. In general, I have found that from 0.2 to 0.5 mole of sodium sulfite per mole of 1-nitroanthraquinone theoretically present based on the anthraquinone or orthobenzoylbenzoic acid originally employed will give 1-nitroanthraquinone of maximum purity where the nitration of the anthraquinone is carried out in sulfuric acid with reasonable amount of care.

I claim:

1. In the process for producing 1-nitroanthraquinone, the step which comprises heating the crude 1-nitroanthraquinone, obtained by direct nitration of anthraquinone, with an aqueous solution of sodium sulfite at normal atmospheric pressure, the amount of sodium sulfite in the solution being from 0.2 to 0.5 mole per mole of nitroanthraquinone theoretically present in the solution.

2. The process for preparing 1-nitroanthraquinone which comprises treating anthraquinone with nitric acid in sulfuric acid of approximately 87% concentration at a temperature of from 65–70° C., isolating the resulting 1-nitroanthraquinone, suspending the crude 1-nitroanthraquinone in a dilute aqueous solution of sodium sulfite containing from about 0.2 to about 0.5 mole per mole of 1-nitroanthraquinone theoretically present, digesting the suspension at reflux, and filtering off the purified 1-nitroanthraquinone.

MYRON S. WHELEN.